United States Patent

[11] 3,626,023

| [72] | Inventor | Bernardas Brizgys |
| | | Southgate, Mich. |
| [21] | Appl. No. | 679,615 |
| [22] | Filed | Nov. 1, 1967 |
| [45] | Patented | Dec. 7, 1971 |
| [73] | Assignee | BSAF Wyandotte Corporation |
| | | Wyandotte, Mich. |

[54] URETHANE COMPOSITIONS
9 Claims, No Drawings

[52] U.S. Cl. ................................................. 260/849,
117/124, 117/126, 117/132, 117/161, 252/188.3,
260/77.5
[51] Int. Cl. ...................................................... C08g 37/32
[50] Field of Search ............................................ 260/849,
77.5 AQ, 850; 252/188.3

[56] References Cited
UNITED STATES PATENTS

| 3,133,032 | 5/1964 | Jen et al. | 260/850 |
| 3,135,707 | 6/1964 | Nyguist | 260/850 |
| 3,242,230 | 3/1966 | Habib | 260/849 |
| 3,384,606 | 5/1968 | Dieterich et al. | 260/849 |
| 3,415,768 | 12/1968 | Dieterich et al. | 260/849 |

FOREIGN PATENTS

| 202,863 | 8/1956 | Australia | 260/850 |
| 203,086 | 8/1956 | Australia | 260/850 |

OTHER REFERENCES

The Chemistry of Phenolic Resins, Martin, John Wiley & Sons, N.Y., 1956, TP 978 M38, pg. 234

Primary Examiner—John C. Bleutge
Attorneys—Bernhard R. Swick, Cedric H. Kuhn, Robert E. Dunn, William R. Day and Joseph D. Michaels ABSTRACT: The subject matter of the present application relates to polyurethane compositions. As disclosed herein, the polyurethane compositions are prepared by heating a composition which comprises polyoxyalkylene polyol, organic polyisocyanate, alkoxyalkylamino compound, acid catalyst, and metallo-organic catalyst.

URETHANE COMPOSITIONS

Polyurethane compositions are usually regarded as the reaction product of a polyisocyanate and an active hydrogen-containing organic compound such as hydroxy-terminated polyester, polyesteramine, amide or polyether.

In general, the art has developed various methods of manufacturing polyurethanes. The preparation of polyurethanes is disclosed in many references including the text entitled "Polyurethanes" by Bernard A. Dombrow, published by Reinhold Publishing Corporation, New York, N.Y., 1957, and "POLYURETHANES: Chemistry and Technology" By J. H. Saunders and K. C. Frisch, published by Interscience Publishers, New York-London, wherein disclosures are made of methods for producing polyurethanes.

In the prepolymer method of manufacturing polyurethanes, the polyisocyanate is stoichiometric excess is first reacted with an active hydrogen-containing organic compound whereby a "prepolymer" is formed. The prepolymer is then reacted with active hydrogen-containing material such as water, diamines, polyethers, etc., whereupon the prepolymer polymerizes and cross-links as a result of the reaction of the excess polyisocyanate with the active hydrogen-containing material.

In the prior art it is known to produce urethane two-component coating systems wherein an isocyanate-terminated intermediate and material containing active hydrogen atoms are maintained separated until just prior to use. It is economically advantageous to prepare urethane coatings by a system wherein all components necessary are blended together prior to use. Coatings employing such a system are described as one-component systems. In general, prior art one-component urethane coating systems employ a procedure for blocking the isocyanate groups. Blocking means simply a process in which the isocyanate group is reacted with a highly relative material such as phenol. To cure such a product the blocking reaction is reversed by means of heat with evolution of phenol and liberation of free NCO groups. The use of a blocked isocyanate permits the isocyanate-terminated intermediate and a material containing active hydrogen atoms to be combined in a one-component system which is stable at room temperature. However, such one-component coating systems have the serious disadvantage of producing coatings that require a high amount of heat for curing and are not very adherent upon many materials such as glass. Further, the prior art coating compositions generally call for a solvent in order to provide compositions suitable for application as a coating.

It is economically advantageous to prepare urethane-ureas by a "one-step" or "one-shot" process in which all the components necessary for application are simply blended together whereby the necessity for reacting the active hydrogen-containing organic compound and the polyisocyanate to produce a prepolymer is eliminated. However, the prior art coating compositions, including the prior art one-component coating systems, require the preparation of a prepolymer, the one-component system generally being a mixture of prepolymer with material containing active hydrogen atoms which mixture is stable at room temperature but can be activated by heating.

Accordingly, it is a purpose of this invention to provide a novel urethane composition, and particularly, a novel coating composition which is curable upon heating, and which is characterized by a high degree of adherence to many materials to which prior art urethane coating compositions do not adhere or do not adhere well, which do not require the preparation of a prepolymer or intermediate compound and do not require a solvent for coating applications.

In accordance with this invention, it has been discovered that curable one-component polyurethane compositions can be prepared which comprise polyoxyalkylene polyol and organic polyisocyanate, in amounts such that the OH/NCO ration is greater than one, alkoxyalkylamino compound, acid catalyst and metallo-organic catalyst.

It has been discovered in accordance with this invention that by blending alkoxyalkylamino compound with polyoxyalkylene polyol and organic polyisocyanate as set forth above without previously reacting the polyol and polyisocyanate to form a prepolymer, the resulting compositions can be cured by simply heating the mixture for from 1 to 30 minutes or more at a temperature of from 150° to 500° F.

The proportions of polyoxyalkylene polyol, organic polyisocyanate, and alkoxyalkylamino compound for the composition of this invention may be varied over a wide range.

The amounts of polyether polymer, also called polyoxyalkylene polyol, and organic polyisocyanate, which are employed in the preparation of the compositions of the present invention, are such that an excess of hydroxyl groups is present. Stated otherwise, the OH/NCO ration of the composition is greater than one, as set forth above. This is necessary if polyurethanes are to be prepared since an excess of hydroxyl groups must be available for reaction with the alkoxyalkylamino compound. It is preferred to employ polyol and polyisocyanate in proportions to provide an OH/NCO ratio of about 8:1 to 1,000:999. In general, there should be about 0.50 to 5 alkoxyalkylamino compound equivalents for each hydroxyl group in excess of the stoichiometric amount for the reaction of polyoxyalkylene polyol with polyisocyanate.

An acid catalyst is incorporated in the composition of this invention to increase the conversion rate of the system. However, such catalyst has a tendency to reduce room temperature stability. Accordingly, the selection of the acid catalyst is dependent upon the desired amount of room temperature stability and the desired rate of conversion.

The amount of acid catalyst generally corresponds to about 0.001 to 5.0 percent of the combined weight of polyoxyalkylene polyol, organic isocyanate, and the alkoxyalkylamino compound. The acid catalysts which may be employed in this invention are those acids conventionally used in the prior art as catalysts and the salts thereof and the expression "acid catalyst," as used herein, includes such conventional well-known catalysts and salts of such acids particularly the morpholine salts. These acid catalysts include xylene sulfonic acid, ortho- and metatoluene sulfonic acids, ethyl acid phosphate, n-butyl phosphoric acid, inorganic acids such as $H_3PO_4$, HCl, etc., acetyl chloride, propionyl chloride, benzoyl chloride, adipyl chloride and organic acids and salts of these acids. A preferred acid catalyst is para-toluenesulfonic acid and the morpholine salt of para-toluenesulfonic acid. A metallo-organic organic salt catalyst is included in the composition of this invention in an amount by weight corresponding to about 0.025 to 1.0 percent based upon the combined weight of polyether polyol, polyisocyanate and alkoxyalkylamino compound and preferably in an amount by weight corresponding to about 0.05 to 0.5 percent of the combined weight.

The metallo-organic catalyst which is employed in the method of the invention is a polyvalent metal compound of an organic acid having up to about 18 carbon atoms and being void of active hydrogen atoms. The organo portion of the compound may be either linear of cyclic and saturated or unsaturated. The polyvalent metal has a valence from about 2 to 4. Typical metallo-organic compounds include stannous acetate, stannous butyrate, stannous 2-ethylhexoate, stannous laurate, stannous octoate, stannous oleate, stannous stearate, lead cyclopentane carboxylate, cadmium cyclohexane carboxylate, lead naphthenate, cobalt naphthenate, zinc naphthenate, cadmium naphthenate, dibutyltin dilaurate, dibutyltin-di-2-ethylhexoate, and the like. Tertiary amines such as triethylenediamine and 1,2,4-trimethyl-piperazine are advantageously used in conjunction with the metallo-organic compounds as catalysts for the "one-step" method described herein.

Coatings produced from the compositions of this invention are highly adherent to materials such as glass and metals on which urethane coatings normally are not very adherent, even at elevated temperatures.

The polyether polymers or polyoxyalkylene polyols, which can be employed in the direct, one-step process disclosed herein include, for example, the oxyalkylene adducts of polyol bases wherein the oxyalkylene portion is derived from monomeric units such as ethylene oxide, propylene oxide, butylene oxide and mixtures thereof. The polyol bases include ethylene glycol, 1,2-propylene glycol, 1,3-propylene glycol, 1,2-butanediol, 1,4-butanediol, hexanetriol, glycerol, trimethylolpropane, hydroquinone, bisphenol-A, pentaerythritol, alpha-methyl glucoside, sorbitol and sucrose; polyethers such as polyethylene ether glycols, polypropylene ether glycols, polytetramethylene ether glycols, and alkylene oxide adducts of polyhydric alcohols including those listed above.

Typical polyether polyols include polyoxyethylene glycol, polyoxypropylene glycol, polyoxybutylene glycol, polytetramethylene glycol, block copolymers, e.g., combinations of polyoxypropylene and polyoxyethylene glycols; poly-1,2-oxybutylene and polyoxyethylene glycols; and poly-1,4-oxybutylene and polyoxyethylene glycols; and random copolymer glycols prepared from blends, or sequential addition, of two or more alkylene oxides. Also, adducts of the above monomeric units with trimethylolpropane, glycerine, and hexanetriol as well as the polyoxypropylene adducts of higher polyols such as pentaerythritol and sorbitol may be employed. Thus, the polyether polyols which can be employed in this "one-step" process are oxyalkylene polymers which have an oxygen/carbon atom ratio from about 1:2 to 1:4 and preferably an oxygen/carbon atom ratio from about 1:2.8 to 1:4 and from about two to eight terminal hydroxyl groups and preferably about two to four terminal hydroxyl groups. The polyether polyols generally have an average equivalent weight from about 30 to 5,000 and preferably have an average equivalent weight from about 100 to 1,000. Polyoxypropylene glycols having molecular weights form about 400 to 2,500 corresponding to equivalent weights from about 200 to 1,250 and mixtures thereof are particularly useful as polyol reactants. Also, polyol blends such as a mixture of high molecular weight polyether polyols can be used in preparing urethanes having good properties.

Organic polyisocyanates which may be employed in the compositions of the present invention include aromatic, aliphatic and cycloaliphatic polyisocyanates and combinations thereof. Representative of these types are the diisocyanates such as m-phenylene diisocyanate, hexamethylene-1,6-diisocyanate, tetramethylene-1,4-diisocyanate, cyclohexane-1,4-diisocyanate, naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyl-diphenylmethane-4,4'-diisocyanate; the triisocyanates such as 4,4',4''-triphenylmethane diisocyanate, and toluene 2,4,6'-triisocyanate; and the tetraisocyanates such as 4,4'-dimethyldiphenylmethane 2,2', 5,5'-tetraisocyanate. Especially useful due to their availability and properties are toluene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

Alkoxyalkylamino compounds suitable for cross-linking in accordance with this invention are described in Modern Plastics Encyclopedia, 1966, pp. 131–132, published by Mc-Graw-Hill Inc., in a bulletin entitled "RESIMENE, melamine and urea resins for baking finishes," Product Information Bulletin No. 1094, published by the Monsanto Chemical Company, Plastics Division, Springfield, Mass., and in a bulletin entitled "Cymel" 300, 301, published by American Cyanamid Company, Plastics and Resins Division, Wallingford, Conn.

Additional alkoxyalkylamino compounds suitable for cross-linking include alkoxylalkyl substituted guanamines, e.g., formoguanamines, benzoguanamines, acetoguanamines, stearoguanamines, etc., diguanamines, alkoxyalkyl substituted thioureas, acrylamides, benzene sulfonamides, toluene sulfonamides, etc. For purposes of this invention it is preferred that these compounds be selected from the group consisting of alkylated urea-formaldehyde compounds and alkylated melamine-formaldehyde compounds, members of which are thoroughly discussed in the above-cited references.

Alkylated urea-formaldehyde resins which may be employed include methyl, ethyl, propyl, butyl, pentyl, hexyl, heptyl, octyl, nonyl and decyl urea-formaldehyde condensates, isomers of these condensates and mixtures thereof.

Alkylated melamine-formaldehyde resins which may be employed include methyl, ethyl, propyl, butyl, pentyl, hexyl, heptyl, octyl, nonyl and decyl melamine-formaldehyde condensates, isomers of these condensates and mixtures thereof.

Additional alkylated melamine-formaldehyde compounds which may be employed include hexamethoxymethylmelamine, hexaethoxymethylmelamine, hexapropoxymethylmelamine, hexabutoxymethylmelamine, hexapentoxymethylmelamine, hexahexoxymethylmelamine, hexaheptoxymethylmelamine, hexaoctoxymethylmelamine, hexanonoxymethylmelamine, hexadecoxymethylmelamine and mixtures thereof.

In addition to the principal components, other additives or ingredients which may be used in the formulation in order to impart special properties to elastomers and coatings include fillers, extenders, pigments and dyes. This invention has the advantage that normal pigmentation methods are applicable, whereas special procedures are generally necessary in prior art one-component urethane coating systems.

The polyol, polyisocyanate, 539,386 amino compound are mixed in the proportions set forth above, generally at room temperature. When it is desired to cure the mixture, it is then heated to a temperature of 150° to 500° F.

A coating process embodying the principles of this invention comprises applying the polyurethane coating compositions presently described to various surfaces by conventional means, such as brushing, spraying, dipping, or coating with a doctor blade. The amount of time needed to cure the coatings will vary with the temperature and the amount of catalyst which is in contact with it. The coating is cured after application to the surface by heating to 150° to 500° F.

The following examples are presented to illustrate the invention.

EXAMPLE I

A series of "one-shot" coating compositions is prepared by mixing the polyols, isocyanates, alkoxyalkylamino compounds, acid or morpholine salt catalysts, and metallo-organic catalysts in the amounts set forth in table I below. In this example the alkoxyalkylamino compound and isocyanate are dissolved in the polyol and the acid or morpholine salt catalyst and metallo-organic catalyst added. All compositions are cast on glass to a thickness of approximately 7 *mills and cured for* 10 minutes at 300° F. A sample of each coating for testing is obtained by immersing the coated glass in water for 72 hours after which a sufficient amount of coating is removed for testing although such removal is difficult. Tensile tests are performed in accordance with ASTM Designation D-882-64T with a jaw speed of 2 inches per minute. Results of the tensile tests are shown in table I below.

TABLE I

| Polyol No. | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| Grams | 8 | 8 | 6 | 9 | 7 | 5 | 2 | 4 | 1/3 | 1/3 | 1/3 | 1/3 | 1/3 | 1/3 |
| Polymethylene polyphenyl isocyanate, gram | 64 | 64 | 101 | 80 | 101 | 57 | 83 | 58.5 | 53.8/24.2 | 53.8/24.2 | 53.8/24.2 | 56.6/25.6 | 53.8/24.2 | 53.8/24.2 |
| Toluene diisoyocyanate, grams | 36 | 36 | 12 | 17 | 12 | 43 | 17 | 41 | | | | 17.8 | | |
| Hexamethoxymethylmelamine, grams | 7 | 14 | 3 | 4.5 | 3 | 10.5 | 4.5 | 10 | 22 | 22 | 22 | 6 | 22 | 22 |
| Butylated urea-formaldehyde resin, grams, 60% solids in a 1:1 by weight xylene butyl alcohol solvent | | | | | | | | | 3 | 6 | 6 | | | 60 |
| p-Toluene sulfonic acid, cc., 10% solution in Cellosolve acetate | 1.0 | 1.0 | 1.2 | 1.0 | 1.2 | 1.1 | 1.0 | 1.1 | 1.0 | 1.0 | 1.0 | 1.0 | 1.0 | 1.0 |
| Morpholine salt of p-toluene sulfonic acid, cc., 10% solution in ethyl alcohol | .2 | .2 | .23 | .2 | .23 | .2 | .2 | .23 | .2 | .2 | .2 | .2 | .2 | 3.0 |
| Stannous octoate, cc | | | | | | | | | | | | | | .2 |
| Properties: | | | | | | | | | | | | | | |
| Tensile strength, p.s.i. | 696 | 340 | 72.8 | 52 | 116 | 8,960 | 110 | 11,360 | 3,600 | 13,200 | 16,280 | 1,120 | 3,000 | 2,760 |
| 100% modulus, p.s.i. | 320 | 172 | 72.8 | 34 | | | | | 2,360 | 6,830 | 10,440 | 475 | 2,860 | 2,700 |
| Elongation, percent | 152 | 154 | 100 | 172 | 90 | 50 | 35 | 63 | 265 | 282 | 223 | 195 | 105 | 100 |
| Elongation set, percent | 4 | 3 | | 1 | 1 | | 1 | | | 47 | 64 | 4 | 2 | 6 |

In table I above, the polyols employed are as follows:

Polyol No. 1 is a polyoxypropylene adduct of bisphenol-A having a molecular weight of 512.

Polyol No. 2 is a polyoxypropylene-trimethylolpropane triol adduct having a molecular weight of 1535.

Polyol No. 3 is a polyoxypropylene glycol having a molecular weight of 766.

Polyol No. 4 is an adduct of polyoxypropylene with pentaerythritol having a molecular weight of 598.

Polyol No. 5 is a polyoxypropylene-trimethylolpropane triol adduct having a molecular weight of 426.

Polyol No. 6 is a polyoxypropylene glycol having a molecular weight of 2000.

Polyol No. 7 is a polyoxyethylene terminated polyoxypropylene glycol having a molecular weight of 2174.

Polyol No. 8 is a polyoxypropylene glycol having a molecular weight of 400.

Polyol No. 9 is a polyoxyethylene adduct of a polyoxypropylene hydrophobic base having a molecular weight of about 950 for the polyoxypropylene hydrophobic base and wherein the oxyethylene content is about 10 weight percent of the molecule.

EXAMPLE II

A coating composition is prepared by the procedure of example I from 15.4 parts by weight of a 30/100 mixture by weight of TDI and MDI (diphenylmethane-4,4'-diisocyanate), 84.6 parts by weight ethylene oxide capped polyoxypropylene glycol having a molecular weight of 1,164, 0.1 part by weight dibutyltin dilaurate, 5 parts by weight of butylated melamine-formaldehyde resin, and 0.6 percent by weight of cellosolve acetate solution containing 10 percent by weight n-butyl phosphoric acid. The material is coated on tin plate and cured for 15 minutes at 300° F. The coating is tack-free and unaffected by immersion in alcohol.

EXAMPLE III

A coating composition, substantially the same as that of example II, is prepared as described in example I with the exception that lead naphthenate is employed in lieu of dibutyltin dilaurate and HCl is employed as a catalyst in lieu of n-butyl phosphoric acid. The material produced is coated on an aluminum substrate and cured for 15 minutes at 300° F. The coating is tack-free and unaffected by immersion in alcohol.

EXAMPLE IV

This example illustrates the production of molded, reinforced plastic products from a composition embodying the principles of this invention. The mixture produced in accordance with example II is poured into a dip tank containing Fiberglas roving in an amount sufficient to completely saturate the Fiberglas roving. Excess resin is then removed after which the solvent is removed by flashing. The saturated Fiberglas roving is then placed in a mold in sufficient quantity to completely fill the mold. The material in the mold is then heated and cured in a press for 5 to 15 minutes at 300° F. producing a molded, solid plastic product.

While there has been shown and described hereinabove the present preferred embodiments of this invention, it is to be understood that various changes, alterations, and modifications can be made thereto without departing from the spirit and scope thereof as defined in the appended claims.

What is claimed is:

1. A new composition of matter consisting essentially of polyoxyalkylene polyol, organic polyisocyanate, hexaalkoxymethylmelamine, acid catalyst and metallo-organic catalyst, and wherein, said polyoxyalkylene polyol and said polyisocyanate are employed in proportions to provide an OH/NCO equivalent ratio ranging from about 8:1 to 1,000:999 and the ratio of equivalents of said alkoxyalkylamino compound for each hydroxyl group in excess of the stoichiometric amount for the reaction of polyisocyanate with polyoxyalkylene polyol ranges from about 0.5:1 to 5:1, the amount of said acid catalyst corresponding to about 0.001 to 5.0 percent of the combined weight of said polyoxyalkylene polyol, polyisocyanate and alkoxyalkylamino compound, and the amount of said metallo-organic catalyst corresponding to about 0.025 to 1.0 percent of the combined weight of polyoxyalkylene polyol, polyisocyanate and alkoxyalkylamino compound.

2. The composition of claim 1 wherein said polyoxyalkylene polyol has an average equivalent weight of from about 30 to 5,000, an oxygen/carbon atom ratio of from about 1:2 to 1:4 and from about two to eight terminal hydroxyl groups.

3. The composition of claim 2 wherein said acid catalyst is paratoluene sulfonic acid.

3. The composition of claim 2 wherein said acid catalyst is morpholine salt of paratoluene sulfonic acid.

5. A new composition of matter which is the "one-shot" reaction product at a temperature of about 150° to 500° F., of polyoxyalkylene polyol, organic polyisocyanate, hexaalkoxymethylmemamine, acid catalyst, and metallo-organic catalyst, and wherein said polyoxyalkylene polyol and said polyisocyanate are employed in proportions to provide an OH/NCO equivalent ratio ranging from about 8:1 to 1,000:999 and the ratio of equivalents of said alkoxyalkylamino compound for each hydroxyl group in excess of the stoichiometric amount for the reaction of polyisocyanate with polyoxyalkylene polyol ranges from about 0.5:1 to 5:1, the amount of said acid catalyst corresponding to about 0.001 to 5.0 percent of the combined weight of said polyoxyalkylene polyol, polyisocyanate and alkoxy-alkylamino compound, and the amount of said metallo-organic catalyst corresponding to about 0.025 to 1.0 percent of the combined weight of polyoxyalkylene polyol, polyisocyanate and alkoxyalkylamino compound.

6. The composition of claim 5 wherein said polyoxyalkylene polyol has an average equivalent weight of from about 30 to 5,000, an oxygen/carbon atom ratio of from about 1:2 to 1:4 and from about two to eight terminal hydroxyl groups.

7. A process for preparing a urethane composition comprising the steps of mixing polyoxyalkylene polyol, organic polyisocyanate, hexaalkoxymethylmelamine, acid catalyst and metallo-organic catalyst, and wherein said polyoxyalkylene polyol and said polyisocyanate are employed in proportions to provide an OH/NCO equivalent ratio from about 8:1 to 1,000:999 and the ratio of equivalents of said alkoxyalkylamino compound for each hydroxyl group in excess of the stoichiometric amount for the reaction of polyisocyanate with polyoxyalkylene polyol ranges from about 0.5:1 to 5:1, the amount of said acid catalyst corresponding to about 0.001 to 5.0 percent of the combined weight of said polyoxyalkylene polyol, polyisocyanate and alkoxyalkylamino compound, and the amount of said metallo-organic catalyst corresponding to about 0.025 to 1.0 percent of the combined weight of polyoxyalkylene polyol, polyisocyanate, and alkoxyalkylamino compound, and heating the mixture at a temperature of 150° to 500° F.

8. The process of claim 7 wherein said polyoxyalkylene polyol has an average equivalent weight of from about 30 to 5,000, an oxygen/carbon atom ratio of from about 1:2 to 1:4 and from about two to eight terminal hydroxyl groups.

9. The process of claim 8 wherein said mixture is applied as a coating to a substrate and then heated at a temperature of about 150° to 500° F.

* * * * *